(12) United States Patent
Bando

(10) Patent No.: US 8,550,874 B2
(45) Date of Patent: Oct. 8, 2013

(54) GLASS-PLATE WORKING MACHINE

(75) Inventor: Kazuaki Bando, Tokushima (JP)

(73) Assignee: Bando Kiko Co., Ltd., Tokushima (JP)

( * ) Notice: Subject to any disclaimer, the term of this patent is extended or adjusted under 35 U.S.C. 154(b) by 401 days.

(21) Appl. No.: 12/735,864

(22) PCT Filed: Feb. 20, 2009

(86) PCT No.: PCT/JP2009/000735
§ 371 (c)(1),
(2), (4) Date: Aug. 31, 2010

(87) PCT Pub. No.: WO2009/104412
PCT Pub. Date: Aug. 27, 2009

(65) Prior Publication Data
US 2010/0330888 A1    Dec. 30, 2010

(30) Foreign Application Priority Data
Feb. 21, 2008  (JP) .................................. 2008-040489

(51) Int. Cl.
*B24B 1/00*    (2006.01)

(52) U.S. Cl.
USPC ........ 451/5; 451/11; 451/14; 451/44; 451/69; 451/70

(58) Field of Classification Search
USPC .................................. 451/5, 11, 14, 44, 69, 70
See application file for complete search history.

(56) References Cited

U.S. PATENT DOCUMENTS

| | | | |
|---|---|---|---|
| 4,660,327 A | 4/1987 | Bando | |
| 4,698,088 A | 10/1987 | Bando | |
| 4,843,764 A | 7/1989 | Bando | |
| 5,040,342 A | 8/1991 | McGuire et al. | |
| 5,221,034 A | 6/1993 | Bando | |
| 5,396,736 A * | 3/1995 | Bando | 451/5 |
| 5,415,581 A | 5/1995 | Bando | |
| 5,810,642 A * | 9/1998 | Bando | 451/5 |

(Continued)

FOREIGN PATENT DOCUMENTS

| | | |
|---|---|---|
| EP | 0 217 658 A1 | 4/1987 |
| EP | 0 372 832 A1 | 6/1990 |

(Continued)

OTHER PUBLICATIONS

International Search Report for PCT/JP2009/000735, mailed Apr. 14, 2009.

*Primary Examiner* — George Nguyen
(74) *Attorney, Agent, or Firm* — Nixon & Vanderhye, PC

(57) ABSTRACT

A glass-plate working machine 1 is arranged such that while a cutting head 9 for forming a cut line on a glass plate 5 and a grinding head 10 for grinding a peripheral edge of the glass plate 5 bend-broken along the cut line are being moved simultaneously in parallel under numerical control, the cutting head 9 and the grinding head 10 respectively having angle control motors 46 and 49 are synchronously subjected to angular control about axes 39 perpendicular to the surface of the glass plate 5, and the cutting head 9 and the grinding head 10 are moved such that the orientation of a cutter wheel 52 is adjusted to a processing line, and the press contacting direction of a grinding wheel 64 of the grinding head 10 is kept in a normal direction with respect to a processing line of an edge of the glass plate 5.

1 Claim, 8 Drawing Sheets

(56) References Cited

U.S. PATENT DOCUMENTS

| | | | | |
|---|---|---|---|---|
| 6,461,223 | B1 * | 10/2002 | Bando | 451/12 |
| 6,743,083 | B2 * | 6/2004 | Bando | 451/190 |
| 7,059,938 | B2 * | 6/2006 | Bando | 451/12 |
| 8,079,895 | B2 * | 12/2011 | Bando | 451/255 |
| 2002/0000099 | A1 | 1/2002 | Bando | |

FOREIGN PATENT DOCUMENTS

| | | |
|---|---|---|
| EP | 0 550 408 A1 | 7/1993 |
| JP | 63-156029 | 6/1988 |
| JP | 2002-68768 | 3/2002 |

* cited by examiner

GLASS-PLATE WORKING MACHINE

This application is the U.S. national phase of International Application No. PCT/JP2009/000735 filed 20 Feb. 2009 which designated the U.S. and claims priority to JP Patent Application No. 2008-040489 filed 21 Feb. 2008, the entire contents of each of which are hereby incorporated by reference.

TECHNICAL FIELD

The present invention relates to a glass-plate working machine whereby glass plates for window glass of automobiles, liquid-crystal glass plates, glass plates for plasma television sets, and the like are manufactured by cutting and edge grinding.

The present invention concerns a glass-plate working machine for concurrently effecting cutting (hereinafter referred to as cut-line formation) and edge grinding by the same apparatus.

Further, the present invention concerns a glass-plate working machine which is adapted to operate by common control data.

Furthermore, the present invention concerns a glass-plate working machine which is arranged such that a cutting head for forming a cut line on the glass plate and a grinding head for grinding an edge of the glass plate subjected to bend-breaking along the cut line are recontrolled about their axes perpendicular to the surface of the glass plate, to ensure that the cutting direction of a cutter wheel is constantly oriented in the tangential direction to the cut line, and such that the press contacting direction of a grinding wheel is kept in the normal direction to an edge of the glass plate.

BACKGROUND ART

[Patent Document 1] JP-A-2002-68768

In Patent Document 1, for example, a glass-plate working machine is shown in which the cutting head and the grinding head are coupled to each other through a line shaft, bevel gears, and the like so as to angularly control the cutting head and the grinding head in parallel, and a controlling motor is connected to the aforementioned line shaft to rotate the line shaft.

DISCLOSURE OF THE INVENTION

Problems to be Solved by the Invention

Incidentally, speeding up has been required in the production of automotive window glass plates. Accordingly, the glass-plate working machine is required to perform high-speed movement.

The rotation of the cutting head and the grinding head under angular control is also required to respond speedily and sensitively.

However, in such a glass-plate working machine, since the cutting head and the grinding head are coupled to each other by tight engagement between bevel gears on a line shaft and bevel gears, inertia and resistance against the rotation are large, so that sensitive response is difficult.

In addition, loose play is likely to be generated.

For this reason, accuracy in the formation of corners of the glass plate declines.

The present invention has been devised in view of the above-described aspects, and its object is to provide a glass-plate working machine which is capable of performing production with high processing accuracy in spite of high-speed processing by allowing the rotation of the cutting head and the grinding head under mutual angular control to respond accurately, speedily, and sensitively.

In addition, another object of the present invention is to provide a glass-plate working machine wherein it is so ensured that compressed air, oil supply, water supply, and power supply can be sent easily and smoothly to required portions of the cutting head and required portions of the grinding head.

Means for Overcoming the Problems

According to the present invention, there is provided a glass-plate working machine comprising: a cutting section including a cutting head with a cutter wheel and a cutting table for supporting a glass plate, for causing the cutting head and the cutting table to undergo contour-controlled movement in an orthogonal plane coordinate system by being subjected to numerical control; and a grinding section including a grinding head with a grinding wheel and a grinding table for holding the glass plate, for causing the grinding head and the grinding table to undergo contour-controlled movement in an orthogonal plane coordinate system by being subjected to numerical control, the cutting section and the grinding section being adapted to depict an identical contour moving locus simultaneously in parallel, while the cutting head and the grinding head being adapted to be angularly controlled about an axis perpendicular to the plane coordinate system, wherein each of the cutting head and the grinding head has an angle control motor so as to synchronously operate angular control of the cutting head and angular control of the grinding head.

In addition, each of the cutting head and the grinding head is laterally mounted to a lower end portion of a respective hollow rotating shaft which is rotatably attached, with its axis perpendicular to a plane of plane coordinate movement, to a moving base which moves as one axis of the plane coordinate movement, and the angle control motor is laterally coupled to an upper end portion of the respective rotating shaft by means of transmitting means, the rotating shaft having a hollow portion extending through from an upper end to a lower end thereof.

Advantages of the Invention

Since the cutting head and the grinding head respectively have angle control motors, the cutting head and the grinding head are directly rotated under angular control independently, so that speedily and sensitively responding angular control can be performed.

The cutting head and the grinding head can be subjected to angular control speedily and accurately in correspondence with a processing line which is depicted under contour control.

Namely, the cutting head is capable of adjusting the orientation of the cutter wheel speedily and accurately to the processing line which moves at high speed and whose direction changes from moment to moment. Meanwhile, the grinding head is able to perform angular control from moment to moment speedily, accurately, and smoothly without loose play so that the grinding head moves while allowing an identical portion of a peripheral edge of the grinding wheel to be oriented toward and press-abutted against and in a normal direction to an edge processing line which changes from moment to moment.

Accordingly, high-speed processing is possible, and high productivity can be obtained.

Further, even in the processing of an acute-angled corner shape, an accurate shape which has no loss of shape can be obtained by high-speed processing.

The rotating shaft having the cutting head mounted at its lower end portion and the angle control motor mounted at its upper end portion to rotate the cutting head under angular control, as well as the rotating shaft having the grinding head mounted at its lower end portion and the angle control motor mounted at its upper end portion to rotate the grinding head under angular control, are both hollow in structure, and the hollow portion extends through from the upper end to the lower end.

Furthermore, since the cutting head, the grinding head, and the angle control motors are laterally mounted to these hollow rotating shafts, the hollow portions of the rotating shafts extend through from the upper end to the lower end and are open.

For this reason, it is possible to pass a compressed air tube, an oil supply tube, a water supply tube, and a power supply line through the hollow portions of the rotating shafts. Hence, despite the fact that the cutting head and the grinding head rotate, compressed air, supply oil, supply water, and power supply can be sufficiently supplied to the cutting head and the grinding head.

BEST MODE FOR CARRYING OUT THE INVENTION

Next, a description will be given of a specific example of the present invention with reference to the drawings.

Figure 1:
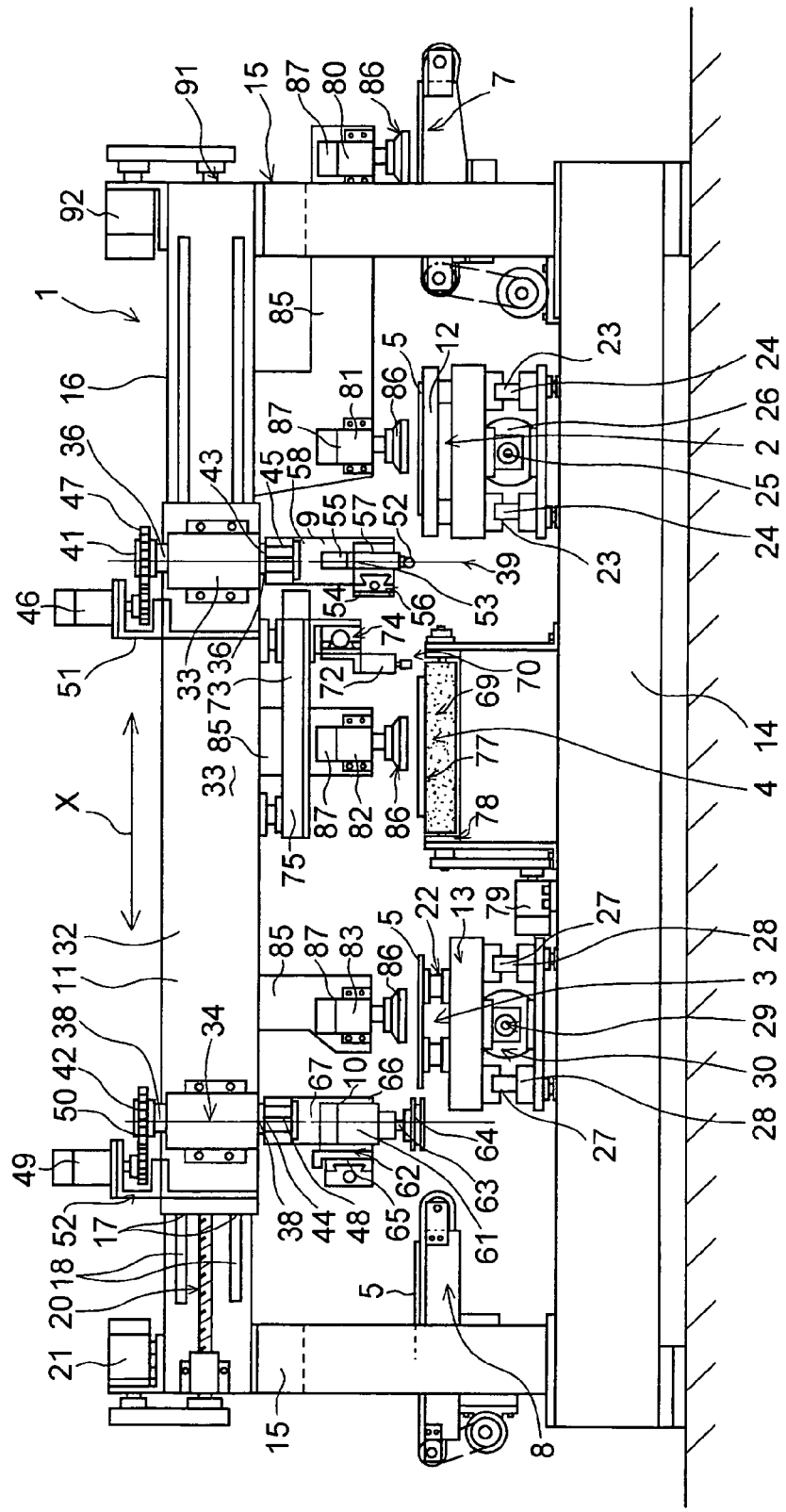
FIG. 1 is a front elevational view of an embodiment of the invention.
Figure 2:
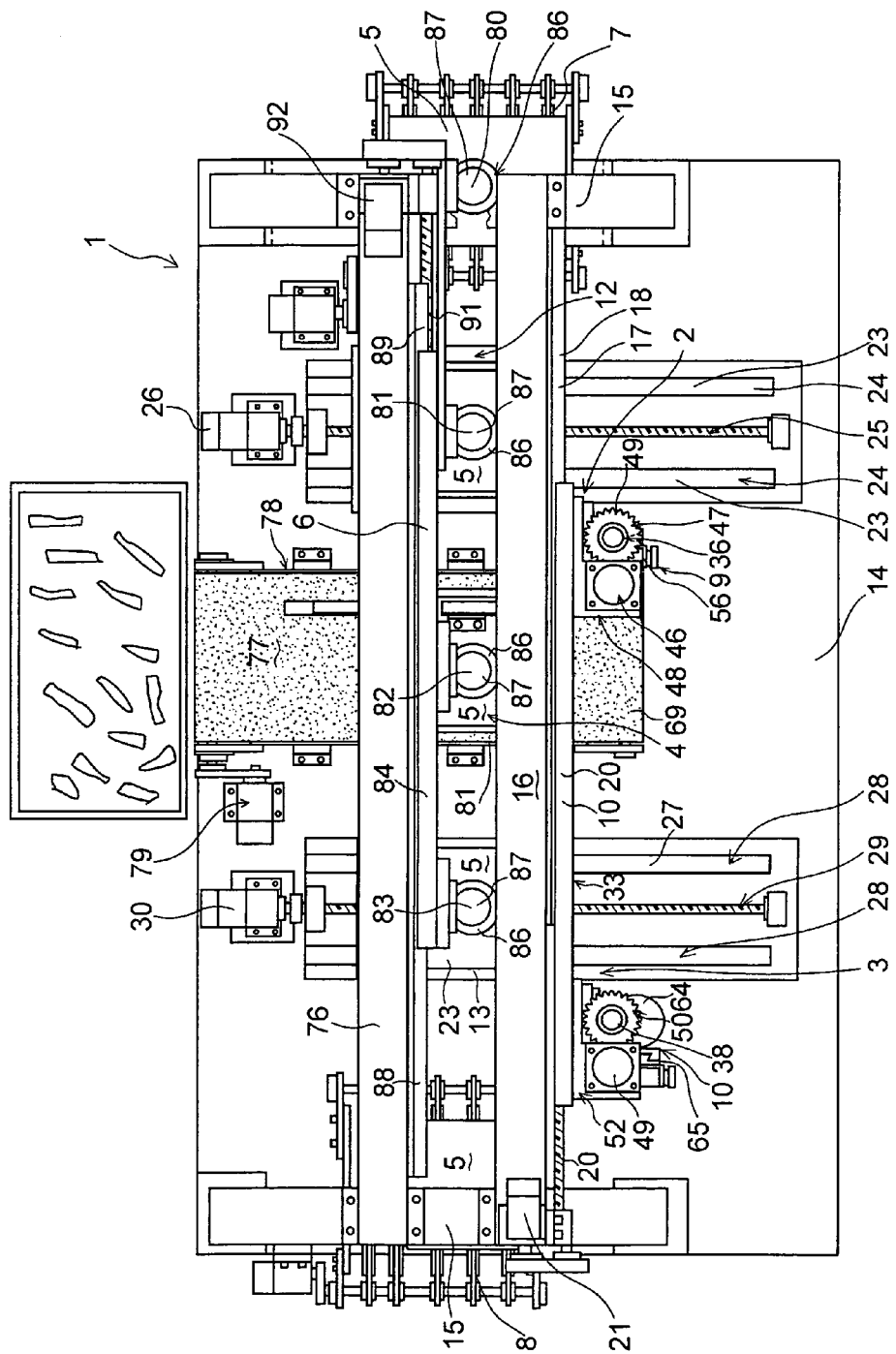
FIG. 2 is a plan view of the embodiment shown in FIG. 1.
Figure 3:
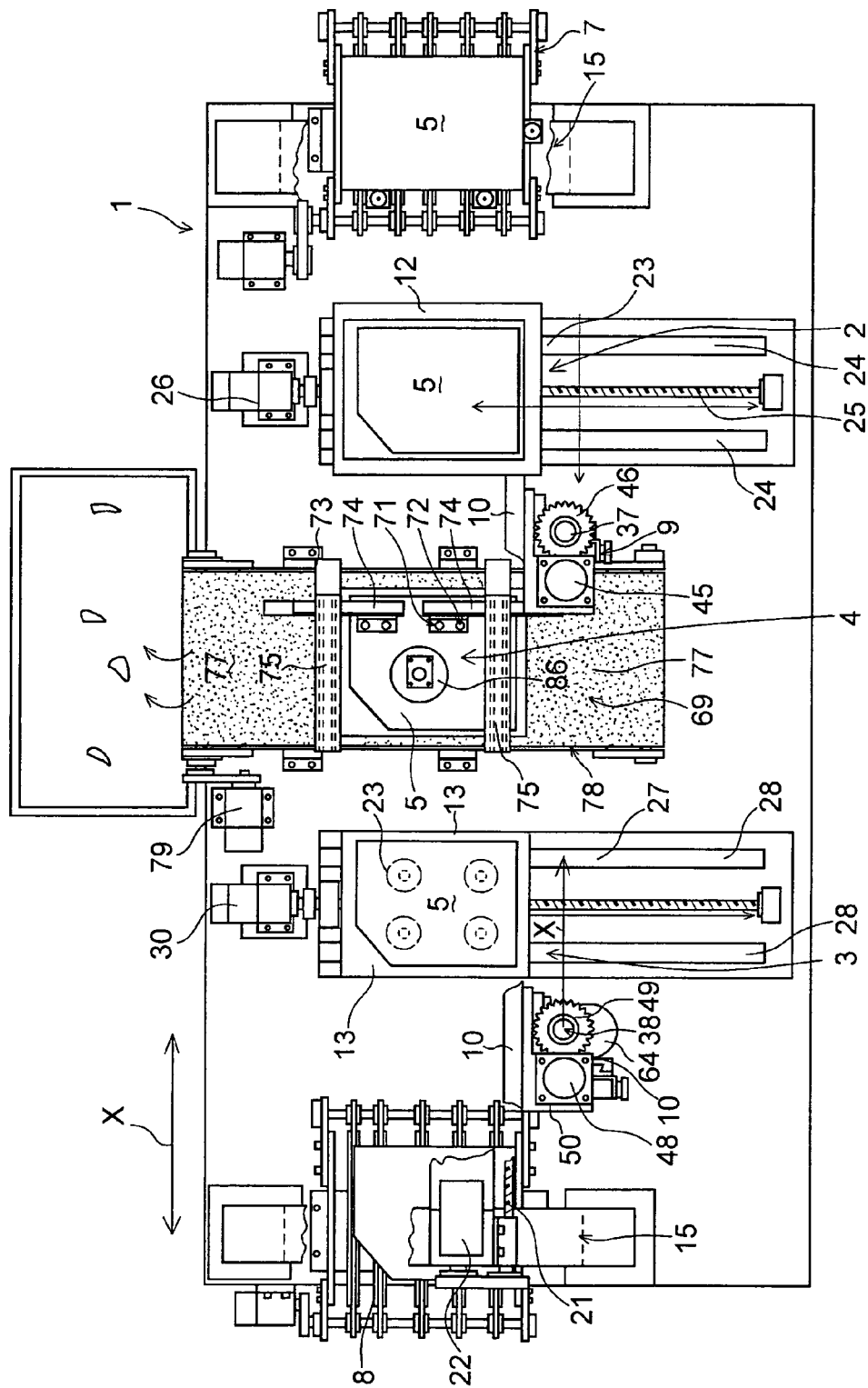
FIG. 3 is a fragmentary plan view of the embodiment shown in FIG. 1.

As shown in FIGS. 1 and 2, in a glass-plate working machine 1 in accordance with this embodiment, a cutting section 2 for forming a cut line on a glass plate 5 is disposed on the right side; a grinding section 3 for grinding peripheral edge of the glass plate is disposed on the left side; a bend-breaking section 4 is disposed in the center; and a glass-plate transporting section 6 for transporting the glass plate 5 is disposed in the rear.

Further, a feed standby conveyor 7 for the glass plate 5 is disposed in front of the cutting section 2, and a discharge conveyor 8 is disposed in the rear of the grinding section 3.

The cutting section 2 is provided with a cutting head 9 having a cutter wheel 52 and a cutting table 12 for supporting the glass plate 5.

In addition, the grinding section 3 is provided with a grinding head 10 having a grinding wheel 64 and a grinding table 13 for holding the glass plate 5. It should be noted that it is a plurality of suction cups 22 disposed on this grinding table 13 that directly hold the glass plate 5 on the grinding table 13.

The aforementioned cutting head 9 and cutting table 12 are subjected to numerical control so as to undergo contour-controlled movement in an orthogonal plane coordinate system, and the aforementioned grinding head 10 and the grinding table 13 are also subjected to NC control so as to undergo contour-controlled movement in the orthogonal plane coordinate system.

In addition, the contour-controlled movement in the cutting section 2 and the contour-controlled movement in the grinding section 3 are identically performed simultaneously in parallel.

The cutting head 9 of the cutting section 2 and the grinding head 10 of the grinding section 3 are mounted on a common moving base 11, and this moving base 11 effects motion (hereafter referred to as the movement) in an X-axis direction.

Accordingly, the cutting head 9 and hence the cutter wheel 52, as well as the grinding head 10 and hence the grinding wheel 64, share an X axis, and integrally effect the movement in the X-axis direction.

Meanwhile, the cutting table 12 which moves in a Y-axis direction in correspondence with the cutting head 9 and the grinding table 13 which moves in the Y-axis direction in correspondence with the grinding head 10 are respectively mounted independently, but are both controlled in synchronism with each other.

A mount 16 is installed upwardly of the cutting table 12 and the grinding head 13.

The mount 16 is installed on a pair of gate-shaped frames 15 erected at front and rear ends of a machine base 14.

Two sets of slide rail devices 17 are provided in parallel on a front face 32 of this mount 16 along the X-axis direction.

Each of these slide rail devices 17 consists of a rail body 18 installed on the mount 16 and a plurality of slides 19 which move on this rail body 18, and the moving base 11 is fixed to these slides 19.

The aforementioned cutting head 9 and grinding head 10 are mounted on this moving base 11, as described above.

Accordingly, the cutting head 9 and the grinding head 10 are integrally moved in the X-axis direction together with the moving base 11 by the aforementioned slide rail devices 17.

The driving of the moving base 11 in the X-axis direction is effected by a feed screw 20 provided between the two sets of slide rail devices 17 and by an X-axis control motor 21 connected to this feed screw 20.

The upper surface of the cutting table 12 is formed so as to flatly support the glass plate 5.

The plurality of suction cups 22 are disposed on the upper surface of the grinding table 13, and the glass plate 5 is fixed onto these suction cups 22 by suction while maintaining its flatness.

The aforementioned cutting table 12 is mounted on a pair of slide devices 23 which are disposed along the Y-axis direction.

Each of these slide devices 23 has a guide rail 24 and slide blocks assembled to this guide rail 24, and the aforementioned cutting table 12 is fixed to these slide blocks.

The movement in the Y-axis direction of the cutting table 12 is effected by a feed screw 25 provided along the guide rails 24 and by a Y-axis control motor 26 connected to the feed screw 25.

In addition, the grinding table 13 is mounted on a pair of slide devices 27 which are similarly disposed along the Y-axis direction.

Of course, each of these slide devices 27 also has a guide rail 28 and slide blocks assembled to this guide rail 28, and the aforementioned grinding table 13 is fixed to these slide blocks.

The movement in the Y-axis direction of the grinding table 13 is effected by a feed screw 29 disposed along the guide rails 28 and by a Y-axis control motor 30 connected to this feed screw 29.

The Y-axis control motor 26 and the Y-axis control motor 30 which are respectively disposed independently are synchronously operated by a numerical controller so that the cutting table 12 and the grinding table 13 are synchronously moved in the Y-axis direction.

Figure 4:
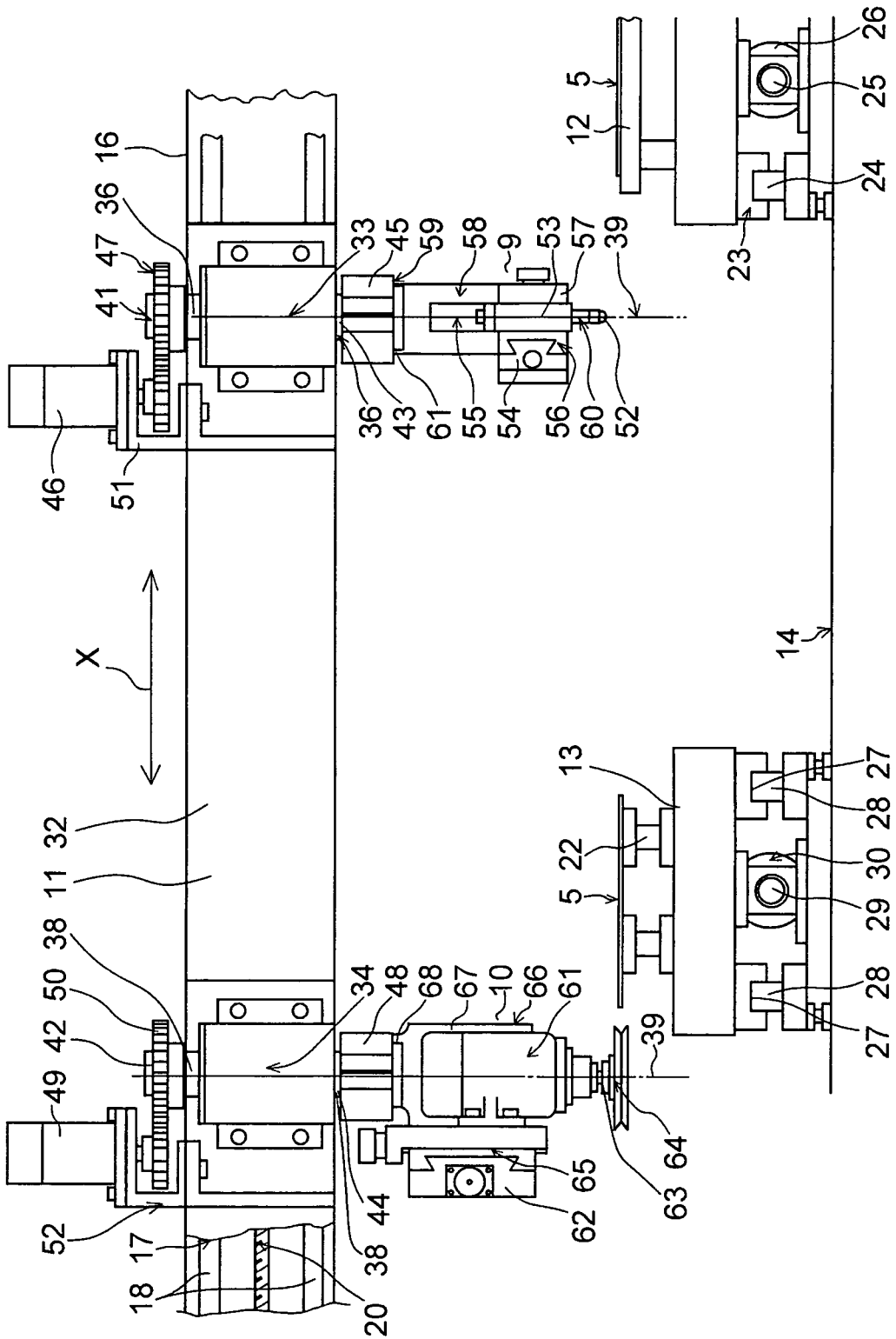
FIG. 4 is a front elevational view of essential portions.
Figure 5:
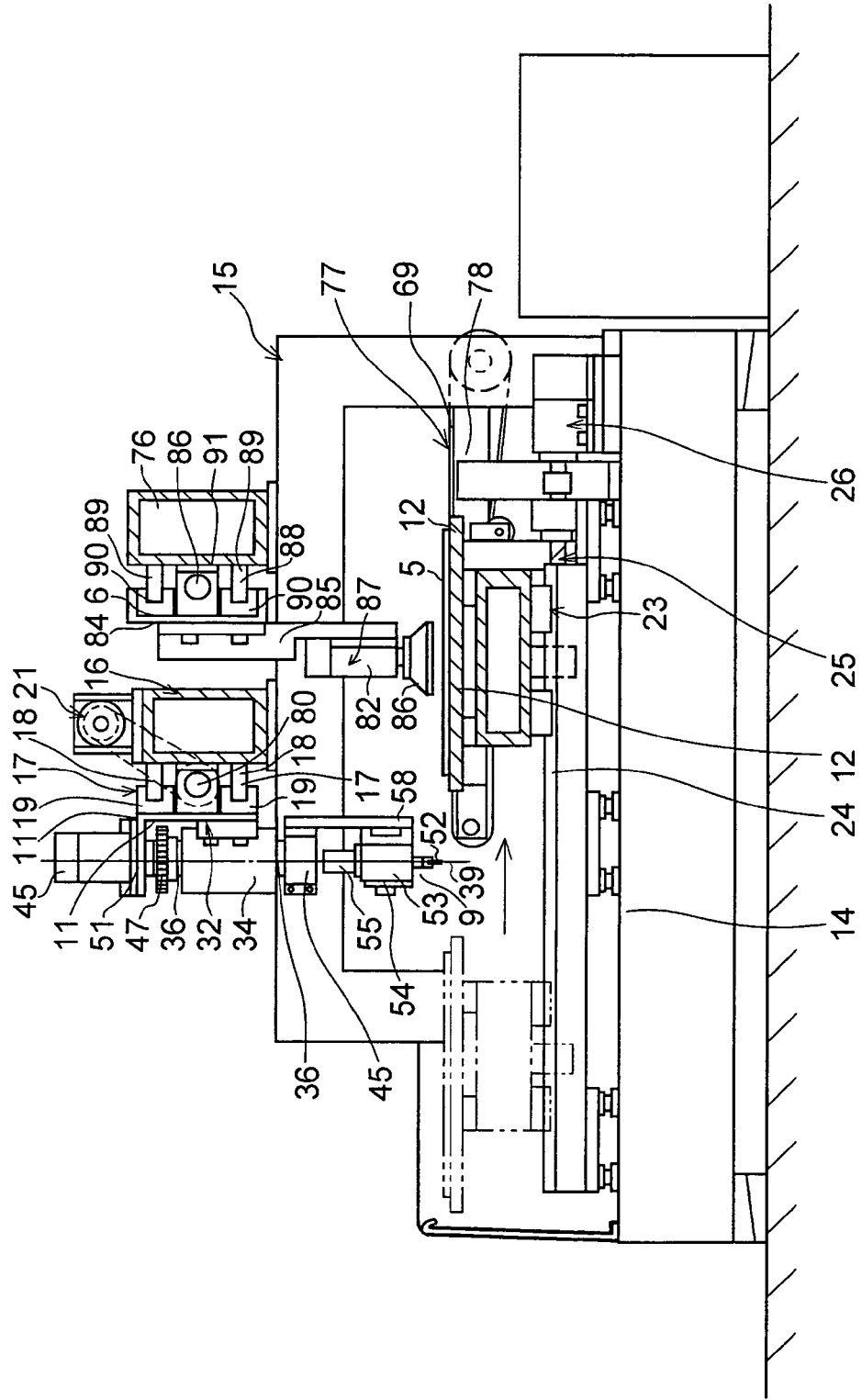
FIG. 5 is a cross-sectional view, taken along line A-A, of the embodiment shown in FIG. 1.
Figure 6:
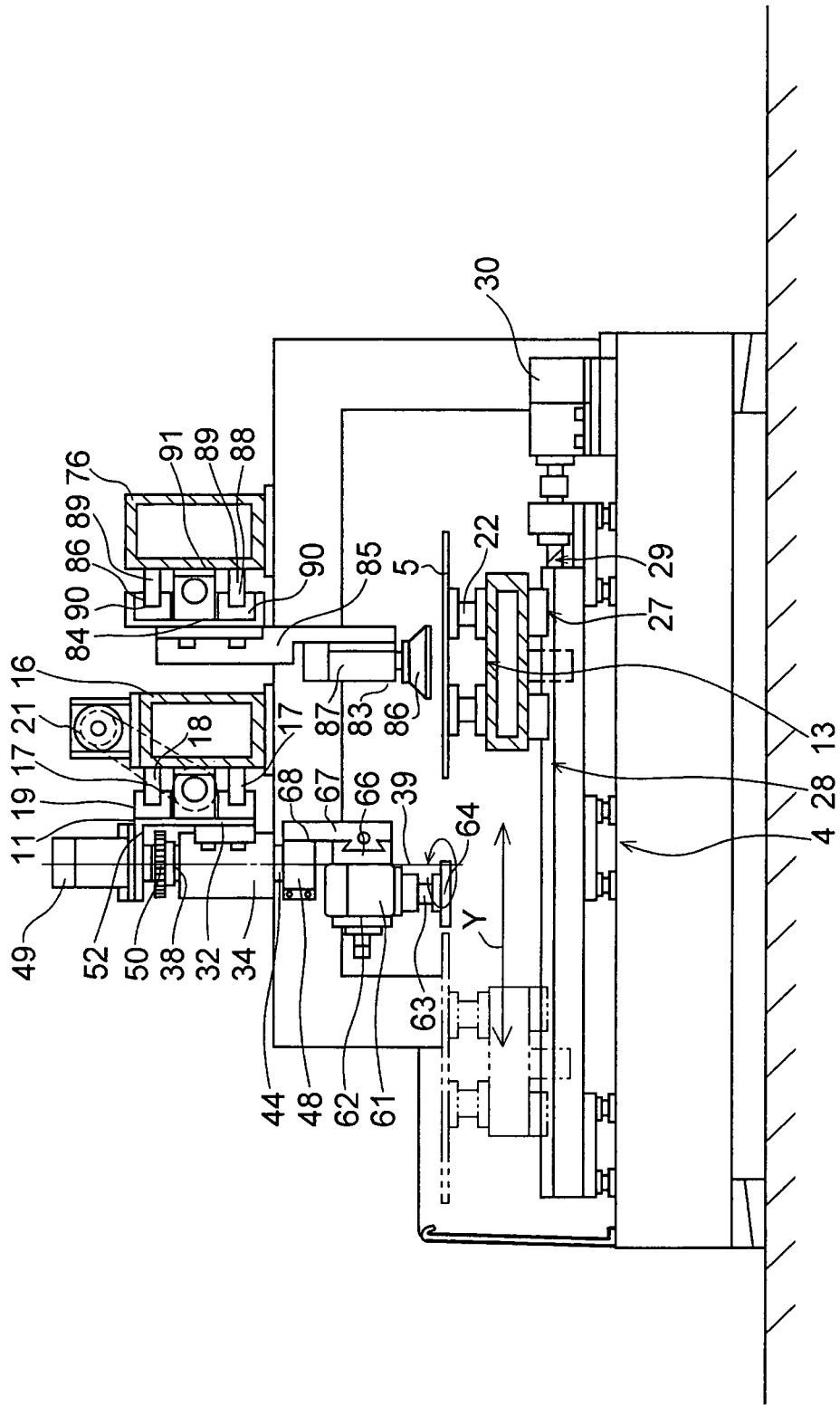
FIG. 6 is a cross-sectional view, taken along line B-B, of the embodiment shown in FIG. 1.

Next, as shown in enlarged form in FIG. 4, on the front face 32 of the moving base 11 which moves in the X-axis direction, a bearing unit 33 is mounted in correspondence with the aforementioned cutting table 12, and a bearing unit 34 is mounted in correspondence with the grinding table 13.

The bearing unit 33 has a rotating shaft 36 which is held by a pair of bearings (not shown).

In addition, the bearing unit 34 has a rotating shaft 38 which is held by a pair of bearings 37.

The aforementioned rotating shafts 36 and 38 are assembled such that their rotational axes are in a state of being perpendicular to the X-Y plane coordinate system, i.e., the upper surface of the glass plate 5.

The rotating shafts 36 and 38 rotate about an axis 39 which is perpendicular to the upper surface of the glass plate 5.

Figure 7:
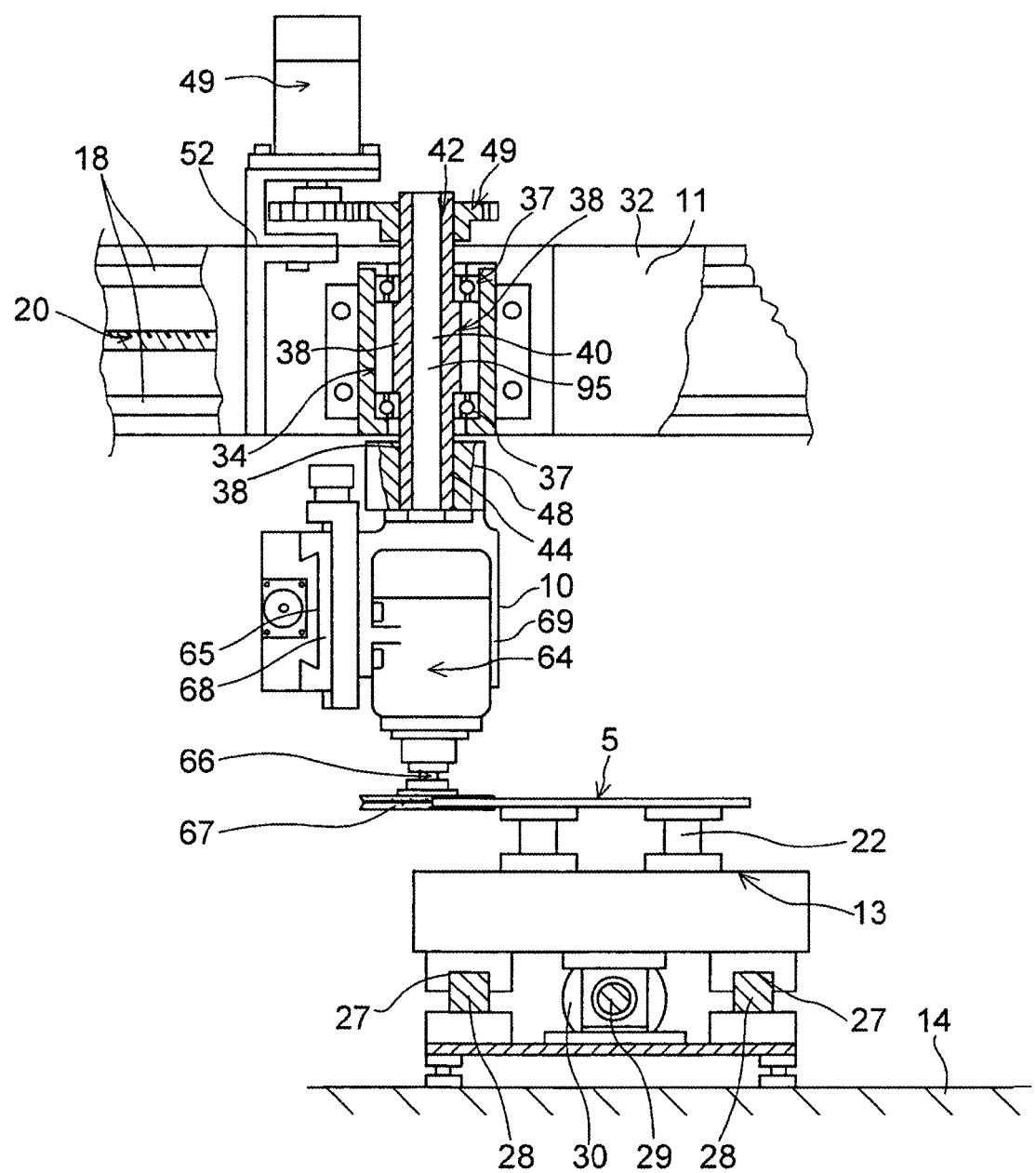
FIG. 7 is a front elevational view of a grinding head whose essential portions are shown in cross section.
Figure 8:
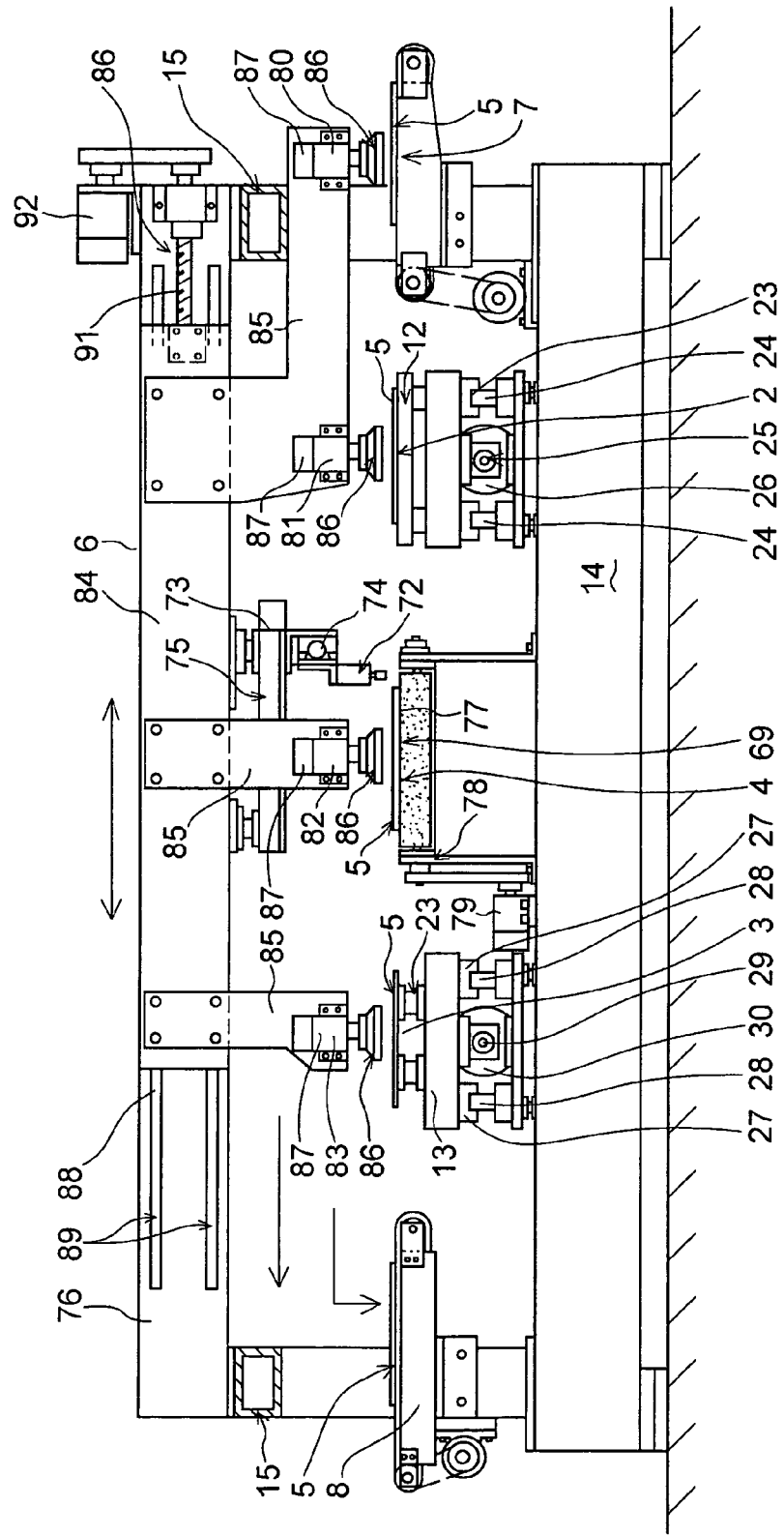
FIG. 8 is a cross-sectional view, taken along line C-C, of the embodiment shown in FIG. 2.

It should be noted that each of the rotating shafts 36 and 38 has a hollow portion 40 extending through from an upper end to a lower end thereof (FIG. 7)

The rotating shaft 36 incorporated in the bearing unit 33 and the rotating shaft 38 incorporated in the bearing unit 34 are both exposed upwardly and downwardly from the respective bearing units 33 and 34 at their upper end portions 41 and 42 and lower end portions 43 and 44.

The cutting head 9 is mounted to the lower end portion 43 of the rotating shaft 36 in the cutting section 2 by means of a bracket 45.

Further, an angle control motor 46 is coupled to the upper end portion 41 of this rotating shaft 36 by means of two spur gears 47.

On the other hand, the grinding head 10 is mounted to the lower end portion 44 of the rotating shaft 38 by means of a bracket 48.

Similarly, an angle control motor 49 is coupled to the upper end portion 42 of this rotating shaft 38 by means of two spur gears 50.

The angle control motor 46 coupled to the rotating shaft 36 and the angle control motor 49 coupled to the rotating shaft 38 are both disposed laterally of the respective rotating shafts 36 and 38, and are coupled at their side portions to the respective rotating shafts 36 and 38 by means of the aforementioned spur gears 47 and 50.

In addition, the aforementioned angle control motors 46 and 49 are respectively held by brackets 51 and 52 erected from the front face 32 of the moving base 11, and naturally move in the X-axis direction integrally with the moving base 11.

In addition, the cutting head 9 mounted at the lower end portion 43 of the rotating shaft 36 and the grinding head 10 mounted at the lower end portion 44 of the rotating shaft 38 are also respectively mounted by means of the aforementioned brackets 45 and 48 which are attached by laterally gripping the respective rotating shafts 36 and 38 at their lower end portions 43 and 44.

Accordingly, the respective rotating shafts 36 and 38 cause the cutting head 9 and the grinding head 10 mounted at the respective lower end portions 43 to undergo angle-controlled rotation about the axis 39 perpendicular to the upper surface of the glass plate 5 by being subjected to the driving of angle-controlled rotation by the angle control motors 46 and 49 at the upper end portions 41 and 42.

As shown in FIG. 2, both the rotating shafts 36 and 38 are hollow in structure. Through that hollow portion 40, a tube for compressed air, a water supply hose, an electric wire, and a tube 95 for oil supply are passed from the upper end portion 41 or 42 to the lower end portion 43 or 44, compressed-air cutter oil or the like is supplied to the cutting head 9 mounted at the lower end portion 43 or 44, and a water supply and a power supply are provided for the grinding head 10.

The cutting head 9 includes a cutter head body 53 having the cutter wheel 52, a position adjusting means 54 for holding this cutter head body 53 and adjusting the position of this cutter head body 53 in two orthogonal directions (X-direction and Y-direction) within a plane parallel to the surface of the glass plate 5, and an air cylinder unit 55 which is mounted at an upper portion of the cutter head body 53, vertically moves the cutter wheel 52 in a Z-axis direction, and imparts cutting pressure to the cutter wheel 52 at the time of forming a cut line on the glass plate 5.

The position adjusting means 54 holds the aforementioned cutter head body 53.

The position adjusting means 54 consists of a Y-direction slide 56, an X-direction slide 57 for holding this Y-direction slide 56 movably in the Y direction, and a bracket 58 for holding this X-direction slide 57 movably in the X-direction.

Further, an upper portion 59 of the bracket 58 is suspendedly mounted on the bracket 45 which is attached by gripping the lower end portion 43 of the rotating shaft 36.

The cutter head body 53 incorporates a shaft 60 to a lower end of which the cutter wheel 52 is attached and a slide bearing for allowing this shaft 60 to undergo vertical sliding motion in the Z-axis direction and guiding the shaft 60.

Further, an upper end of the shaft 60 is connected to a piston rod of the aforementioned air cylinder unit 55.

As the Y-direction slide 56 is subjected to finely adjusted movement, the cutting head 9 is able to make fine adjustment of the locus of the cut line by adjusting or offsetting the cutter wheel 52 to and from the axis of the rotating shaft 36.

The cutting head 10 includes a spindle motor 61 and a position adjusting means 62 for adjusting the position of this spindle motor 61 in two orthogonal directions (X-direction and Y-direction), respectively, within a plane parallel to the surface of the glass plate 5. Further, the grinding wheel 64 is mounted on a rotating shaft 63 of the spindle motor 61.

The position adjusting means 62 consists of a Y-direction slide 65 for holding the aforementioned spindle motor 61, an X-direction slide 66 for holding this Y-direction slide 65 movably in the Y direction, and a bracket 67 for holding this X-direction slide 66 movably in the X-direction.

An upper portion 68 of this bracket 67 is suspendedly mounted on the bracket 45 which is attached by gripping the lower end portion 44 of the rotating shaft 38.

The grinding wheel 64 is so arranged that its peripheral end face (grinding face) coincides with the axis of the rotating shaft 38 by the adjustment of the aforementioned position adjusting means 62. It should be noted that the position of the peripheral end face (grinding face) of the grinding wheel 64 with respect to the axis of the rotating shaft 38 is finely changed by moving through fine adjustment the aforementioned Y-direction slide 65 in the Y direction, to thereby adjust a grinding allowance.

The bend-breaking section 4 includes a horizontal belt conveyor 69 on which is placed the transported glass plate 5 with the cut line formed thereon, as well as two bend-breaking devices 70 for bend-breaking the glass plate 5 placed on this belt conveyor 69.

Each of the bend-breaking devices 70 consists of an end cutter unit 71, a press unit 72, and a moving means 73 for holding the end cutter unit 71 and the press unit 72 and for moving the end cutter unit 71 and the press unit 72 over the glass plate 5 along the surface of the glass plate 5.

The moving means 73 includes a Y-direction moving unit 74 for holding the end cutter unit 71 and the press unit 72 and for moving under numerical control the end cutter unit 71 and the press unit 72 in the Y direction, as well as an X-direction moving unit 75 for moving under numerical control this Y-direction moving unit 74 in the X direction. This X-direction moving unit 75 is mounted on the mount 16 and a mount 76 by means of brackets.

The belt conveyor 69 includes a conveyor belt 77, a supporting plate/frame 78 for supporting the conveyor belt 77 from inside in the form of a flat surface, and a drive unit 79 for causing the belt conveyor 69 to rotate, and is supported by the machine base 14 by means of brackets in the supporting plate/frame 78.

In terms of the operation of the bend-breaking section 4, first, the glass plate 5 with the cut line formed thereon in the cutting section 2 is placed on the belt conveyor 69 by a suction pad unit 80 corresponding to the cutting section 2. Then, this suction pad unit 80 returns to the cutting section 2, and a suction pad unit 81 corresponding to the bend-breaking section 4, which returned to this bend-breaking section 4, is alternatively lowered and presses the glass plate 5 placed on the belt conveyor 69, to thereby set the glass plate 5 in a fixed state.

Then, the end cutter unit 71 of the bend-breaking device 70 is consecutively moved to necessary positions to cut end cutting lines on the glass plate 5. Next, the press unit 72 is consecutively moved to necessary positions to effect pressing, thereby bend-breaking and separating unrequired portions.

The glass plate 5 whose unrequired portions have been bend-broken and separated is sucked and lifted up by the suction pad 81 corresponding to the bend-breaking section 4, and in this state awaits its conveyance to the ensuing grinding section 3.

At this time, the belt conveyor 69 is operated to discharge bend-broken cullet on the conveyor belt 77 to the outside.

The glass-plate transporting section 6 consists of a reciprocally moving base 84 which reciprocatingly moves over the cutting table 12, the belt conveyor 69 of the bend-breaking section 4, and the suction cups 22 on the grinding table 13 in parallel therewith in the X direction, four suction pad units 80, 81, 82, and 83 mounted on this reciprocally moving base 84 by means of brackets 85 at fixed intervals, and a feed screw 91 and a feed shaft control motor 92 serving as drive units for causing the reciprocally moving base 84 and the suction pad units 80, 81, 82, and 83 to reciprocate integrally over fixed intervals.

The suction pad unit 80 is provided in correspondence with the feed standby conveyor 7, the suction pad unit 81 is provided in correspondence with the cutting table 12, the suction pad unit 82 is provided in correspondence with the belt conveyor 69 of the bend-breaking section 4, and the suction pad unit 83 is provided in correspondence with the suction cups 22 on the grinding table 13.

Each of the aforementioned suction pad units 80, 81, 82, and 83 consists of a suction pad 86 for sucking or releasing the glass plate 5 and a vertically moving device 87 for vertically moving this suction pad 86. This vertically moving device 87 is mounted on the aforementioned bracket 85.

It should be noted that since the bracket 85 is mounted on the reciprocally moving base 84, the suction pad units 80, 81, 82, and 83 are fixed to the reciprocally moving base 84.

The reciprocally moving base 84 is mounted on a pair of slide devices 88 which are installed on the aforementioned mount 76 in parallel in the X-axis direction.

Each slide unit 88 consists of one of a pair of guide rails 89 laid in parallel, as well as slides 90 which are assembled to the guide rail 89. The aforementioned reciprocally moving base 84 is mounted on these slides 90. The reciprocating movement of the reciprocally moving base 84 is driven by the feed screw 91 provided between the pair of guide rails 89 and by the feed shaft control motor 92 connected to this feed screw 91. The feed shaft control motor 92 effects accurate transport through numerical control based on numerical information from a numerical controller.

It should be noted that the aforementioned second mount 76 is installed on the pair of frames 15 erected at front and rear ends of the machine base 14, in such a manner as to be located in the rear of the aforementioned first mount 16 in parallel therewith.

In terms of the operation of the glass-plate transporting section 6, the transport starting position is when the suction pad unit 80, the suction pad unit 81, the suction pad unit 82, and the suction pad unit 83 are on standby over the feed standby conveyor 7, the cutting table 12, the belt conveyor 69 of the bend-breaking section 4, and the grinding table 13, respectively.

At this transport starting position, the suction pad 86 of the suction pad unit 80, the suction pad 86 of the suction pad unit 81, the suction pad 86 of the suction pad unit 82, and the suction pad 86 of the suction pad unit 83 are concurrently lowered to suck and raise the glass plates 5. Next, the reciprocally moving base 84 moves in the advance stroke, such that the suction pad unit 80 in a state of sucking the glass plate 5 arrives over the cutting table 12, the suction pad unit 81 arrives over the belt conveyor 69 of the bend-breaking section 4, the suction pad unit 82 arrives over the suction cups 22 on the grinding table 13, and the suction pad unit 83 arrives over the discharge conveyor 8, all as one integral unit. Then, the respective suction pad units 80, 81, 82, and 83 lower the suction pads 86 and release the glass plates 5 to place the glass plates 5 on the cutting table 12, the belt conveyor 69, the suction cups 22 on the grinding table 13, and the discharge conveyor 8, respectively. Subsequently, the respective suction pad units 80, 81, 82, and 83 raise the suction pads 86 and return to the starting position in the return stroke together with the reciprocally moving base 84.

Through the above-described operation of the glass-plate transporting section 6, the unshaped glass plate 5 on the feed standby conveyor 7 is discharged onto the cutting table 12, the glass plate 5 with the cut line formed on the cutting table 12 is discharged onto the belt conveyor 69 of the bend-breaking section 4, the glass plate 5 subjected to bend-breaking in the bend-breaking section 4 is discharged onto the sucking cups 22 on the grinding table 13, and the glass plate 5 with its edges ground on the suction cups 22 on the grinding table 13 is discharged onto the discharge conveyor 8.

Through the repetition of the above-described operation of the glass-plate transporting section 6, the glass plate 5 is consecutively fed from the feed standby conveyor 7 onto the cutting table 12, the belt conveyor 69 of the bend-breaking section 4, the suction cups 22 on the grinding table 13, and the discharge conveyor 8.

Next, a detailed description will be given of the operation of the cutting section 2 and the grinding section 3 in the glass-plate working machine 1 in accordance with this embodiment constructed as described above.

When the unshaped glass plate 5 is carried onto the cutting table 12, and the bend-broken glass plate 5 is carried onto the suction cups 22 on the grinding table 13, the cutting head 9 and the grinding head 10 undergo X-axis movement integrally with the common moving base 11. Meanwhile, the cutting table 12 and the grinding table 13 both undergo Y-axis movement under synchronous control.

In the cutting section 2, the cutter wheel 52 of the cutting head 9 and the glass plate 5 on the cutting table 12 undergo contour-controlled movement, whereby the cutter wheel 52 moves along a cutting line on the glass plate 5.

At the same time, in the grinding section 3, the grinding wheel 64 of the grinding head 10 and the glass plate 5 sucked by and held on the suction cups 22 on the grinding table 13 undergo contour-controlled movement, so that the grinding wheel 64 moves around the peripheries of the glass plate 5.

The cutter wheel 52 of the cutting head 9 and the grinding wheel 64 of the grinding head 10 move while depicting an identical moving locus simultaneously in parallel.

At this time, concurrently, the angle control motor 46 provided for the cutting head 9 and the angle control motor 49 provided for the grinding head 10 are synchronously operated so that control of an identical rotational angle is effected for the cutting head 9 and the grinding head 10 synchronously in parallel. At this juncture, the cutting head 9 moves while adjusting the orientation of the cutter wheel 52 to the cutting line whose direction changes from moment to moment, whereas the grinding head 10 moves while undergoing oscillation so that the pressing direction of the grinding wheel 64 is constantly oriented in a direction normal to a side end face of the glass plate 5.

Namely, the cutting section 2 and the grinding section 3 undergo depiction of an identical contour moving locus and identical-angle controlled movement simultaneously in parallel, and concurrently perform the formation of a cut line (cutting) on the glass plate 5 and peripheral edge grinding of the glass plate 5.

In the working of the glass plate 5 in the above-described manner, the cutting head 9 and the grinding head 10 are respectively provided with the angle control motors 46 and 49 and are directly subjected to angle-controlled rotation. Hence, the cutting head 9 is capable of adjusting the orientation of the cutter wheel 52 speedily, sensitively, and accurately to the processing line whose direction changes from moment to moment, whereas the grinding head 10 is able to perform angular control speedily, accurately, and smoothly without loose play so that the grinding head 10 moves while allowing an identical portion of the peripheral edge portion of the grinding wheel 64 to be oriented toward and press-abutted against and in a normal direction to an edge processing line of the glass plate which changes from moment to moment.

Accordingly, high-speed processing is possible, and high productivity can be obtained. Further, even in the processing of an acute-angled corner shape, an accurate shape which has no loss of shape can be obtained by high-speed processing.

In addition, the rotating shaft having the cutting head mounted at its lower end portion and the angle control motor mounted at its upper end portion to rotate the cutting head under angular control, as well as the rotating shaft having the grinding head mounted at its lower end portion and the angle control motor mounted at its upper end portion to rotate the grinding head under angular control, are both hollow in structure, and the hollow portion extends through from the upper end to the lower end. Furthermore, since the cutting head, the grinding head, and the angle control motors are laterally mounted to these hollow rotating shafts, the hollow portions of the rotating shafts extend through from the upper end to the lower end and are open. For this reason, it is possible to pass a compressed air tube, an oil supply tube, a water supply tube, and a power supply line through the hollow portions of the rotating shafts. Hence, despite the fact that the cutting head and the grinding head rotate, compressed air, supply oil, supply water, and power supply can be sufficiently supplied to the cutting head and the grinding head.

The invention claimed is:

1. A glass-plate working machine comprising: a cutting section including a cutting head with a cutter wheel and a cutting table for supporting a glass plate, for causing said cutting head and said cutting table to undergo contour-controlled movement in an orthogonal plane coordinate system by being subjected to numerical control; and a grinding section including a grinding head with a grinding wheel and a grinding table for holding the glass plate, for causing said grinding head and said grinding table to undergo contour-controlled movement in an orthogonal plane coordinate system by being subjected to numerical control, said cutting section and said grinding section being adapted to depict an identical contour moving locus simultaneously in parallel, while said cutting head and said grinding head being adapted to be angularly controlled about an axis perpendicular to the plane coordinate system, wherein each of said cutting head and grinding head has an angle control motor so as to synchronously operate angular control of said cutting head and angular control of said grinding head, wherein each of said cutting head and said grinding head is laterally mounted to a lower end portion of a respective hollow rotating shaft which is rotatably attached, with its axis perpendicular to a plane of plane coordinate movement, to a moving base which moves as one axis of the plane coordinate movement, and said angle control motor is laterally coupled to an upper end portion of said respective rotating shaft by means of transmitting means, said rotating shaft having a hollow portion extending through from an upper end to a lower end thereof.

* * * * *